US009350907B2

(12) United States Patent
Matsuura et al.

(10) Patent No.: US 9,350,907 B2
(45) Date of Patent: May 24, 2016

(54) DRIVE DEVICE WHICH CAN BE FREELY ATTACHED TO/DETACHED FROM LENS BARREL, AND PROCESS CONTROL METHOD AND ADJUSTMENT METHOD FOR SAME

(71) Applicant: FUJIFILM Corporation, Tokyo (JP)

(72) Inventors: Yuuji Matsuura, Saitama (JP); Atsushi Misawa, Saitama (JP); Kentaro Imagawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 4 days.

(21) Appl. No.: 14/604,775

(22) Filed: Jan. 26, 2015

(65) Prior Publication Data

US 2015/0138437 A1    May 21, 2015

Related U.S. Application Data

(63) Continuation of application No. PCT/JP2013/072728, filed on Aug. 26, 2013.

(30) Foreign Application Priority Data

Aug. 29, 2012   (JP) .................................. 2012-188622

(51) Int. Cl.
*H04N 5/225*     (2006.01)
*G03B 17/00*     (2006.01)
(Continued)

(52) U.S. Cl.
CPC .............. *H04N 5/2254* (2013.01); *G02B 7/102* (2013.01); *H04N 1/2129* (2013.01)

(58) Field of Classification Search
CPC ... H04N 5/2254; H04N 1/2129; G02B 7/102; G02B 7/001; G02B 7/09
See application file for complete search history.

(56) References Cited

U.S. PATENT DOCUMENTS

| 2008/0024889 A1* | 1/2008 | Idemura ................. | G02B 7/102 |
| | | | 359/824 |
| 2010/0226634 A1* | 9/2010 | Yamamoto ............. | G02B 7/282 |
| | | | 396/80 |

(Continued)

FOREIGN PATENT DOCUMENTS

| JP | 2011-107334 | 6/2011 |
| JP | 2011-107395 | 6/2011 |
| JP | 2012-042635 | 3/2012 |

OTHER PUBLICATIONS

International Search Report PCT/JP2013/072728 dated Nov. 26, 2013.

(Continued)

*Primary Examiner* — Aung S Moe
*Assistant Examiner* — John H Morehead, III
(74) *Attorney, Agent, or Firm* — Young & Thompson

(57) ABSTRACT

There are provided a drive device that is detachably mounted on a lens barrel making time, which is required until the position of a zoom ring is detected, uniform, a method of controlling initial processing for storing a result of initial processing in a memory, and a method of adjusting an angular position. A series of pulses are output from an encoder 45 according to the rotation of a zoom ring. A reference signal is output from a photo interrupter 40 at an intermediate position of a movable range of the zoom ring. The present position of the zoom ring is calculated from the pulses of the encoder that are generated after the rising or falling of the reference signal. Time, which is required until the position of the zoom ring is detected, is made uniform.

20 Claims, 12 Drawing Sheets

(51) Int. Cl.
*G02B 7/10* (2006.01)
*H04N 1/21* (2006.01)

(56) References Cited

U.S. PATENT DOCUMENTS

2011/0109982 A1* 5/2011 Mitarai .................. G02B 7/102
359/825

2012/0044417 A1* 2/2012 Fujiwara ................ G03B 17/02
348/375

OTHER PUBLICATIONS

Written Opinion of the International Searching Authority PCT/JP2013/072728 dated Nov. 26, 2013.

* cited by examiner

DRIVE DEVICE WHICH CAN BE FREELY ATTACHED TO/DETACHED FROM LENS BARREL, AND PROCESS CONTROL METHOD AND ADJUSTMENT METHOD FOR SAME

CROSS-REFERENCE TO RELATED APPLICATIONS

This application is a Continuation of PCT International Application No. PCT/JP2013/072728 filed on Aug. 26, 2013, which claims priority under 35 §119(a) to Japanese Patent Application No. 2012-188622 filed on Aug. 29, 2012. Each of the above applications is hereby expressly incorporated by reference, in its entirety, into the present application.

BACKGROUND OF THE INVENTION

1. Field of the Invention

The present invention relates to a drive device that is detachably mounted on a lens barrel, a method of controlling the drive device, and a method of adjusting the drive device.

2. Description of the Related Art

Operation rings, such as a focus ring, a zoom ring, and an iris ring, are rotatably provided on the outer periphery of a lens barrel, and the adjustment of an optical system provided in the lens barrel, for example, focusing (focus adjusting), zooming, and iris adjustment are performed by the rotation of these operation rings. The lens barrel is used while being mounted on a camera. However, there are a case in which the operation rings is manually operated (rotated) and a case in which the operation rings are rotated by a drive device, For example, a cameraman who makes a movie tends to prefer manual operation, and a cameraman who takes pictures for television broadcasting prefers the use of a drive device.

Accordingly, a drive device that is detachably mounted on a lens barrel is used to be capable of coping with these use forms. Gradations are formed on the operation rings. Accordingly, when the operation rings are manually operated without using a drive device, the position of each operation ring can be visually checked. However, when a drive device is mounted, it is preferable that the positions of the respective operation rings be detected and be displayed on a camera as a focus distance, a zoom ratio, an aperture value, and the like.

JP2012-42635A discloses a device that optically detects the position of a focus lens in a digital still camera, but does not instruct means for solving particular problems of a drive device that is detachably mounted on a lens barrel. JP2011-107395A and JP2011-107334A relate to a lens barrel on which a drive device is detachably mounted. However, JP2011-107395A merely detects only a specific position of focusing. JP2011-107334A discloses that the present set position of each of a focus lens group, a zoom (variable power) lens group, and an iris provided in a lens barrel are detected by a potentiometer provided in a drive unit (device). The potentiometer generates a voltage corresponding to an angular position thereof. Accordingly, when the drive device is mounted on the barrel, the positioning of the potentiometer and the operation ring needs to be performed by an adjustment tool so that an output voltage of the potentiometer correctly represents the position of the operation ring. For this reason, it is difficult to simply mount the drive device on the lens barrel on site.

SUMMARY OF THE INVENTION

The use of an optical encoder disclosed in JP2012-42635A is considered for accurate position detection but the optical encoder (incremental encoder) requires processing for returning the optical encoder to an origin. The position of the origin is generally set to an end of a movable range. In this case, the operation ring should be necessarily moved to the end of the movable range due to the processing for returning the optical encoder to an origin.

An object of the invention is to be capable of detecting the position of an operation ring based upon a reference position in a short time as much as possible without intentionally moving an operation ring to an end point of a movable range for the return to an origin by using a rotation detector that generates a series of pulses representing a rotation angle represented by an encoder for the detection of a position.

A drive device (drive unit) according to the invention is detachably mounted on a lens barrel holding an optical system, and includes a ring drive system (ring drive device) that rotationally drives an operation ring rotatably provided on the outer periphery of the lens barrel. The drive device further includes a ring position detecting system (detecting device) that detects the position of the operation ring. The ring position detecting system includes a rotation transmission mechanism that includes a detection gear provided at a position where the detection gear meshes with a gear of the operation ring when the drive device is mounted on the lens barrel, an encoder that detects the rotation of a rotating shaft included in the rotation transmission mechanism and outputs a series of pulse signals representing the rotation of the operation ring, and a reference signal generator that detects the rotation of the rotating shaft included in the rotation transmission mechanism and adjusts a position of the rotating shaft so that a reference signal is generated at an intermediate position of a movable range of the operation ring.

The position of the operation ring is most commonly indicated by an angular position. Instead, the position of the operation may be indicated by the positions of various lenses, such as a focus lens (or focus lens group) and a zoom lens (or zoom lens group), in the axial direction of the barrel, that are adjusted by the operation ring, or a focus distance, a zoom ratio, an aperture value, and the like, because these positions or values can be converted to each other. The positions of various lenses or the values to be used for indicating the position of the operation ring may be selected depending on the circumstances of a control system and a display system.

The intermediate position of the movable range of the operation is a range except for both ends of the movable range or the vicinity of both ends of the movable range. In an aspect in which one reference signal is generated in the movable range of the operation ring, a middle portion (the middle or the vicinity of the middle) of the movable range is preferable as the intermediate position. In an aspect in which two reference signals are generated in the movable range of the operation ring, a middle portion (in this case, reference signals are generated at two positions where the movable range is divided into substantially the same three portions), when the movable range is divided into substantially the same three portions, is preferable as the intermediate position, or two positions except for a middle, when the movable range is divided into the some four portions, are preferable as the intermediate position. Considering an object of the invention that allows the operation ring to pass through a reference-signal-generation position (reference position) at any position in the movable range as quickly as possible, it is appropriate that "the intermediate position of the movable range of the operation ring" is a middle portion except for about ⅕ portions of both end portions of the movable range. However, if the number of reference signals is increased, the range of the middle portion is widened but processing becomes complicated. Accordingly, it is preferable that the number of reference signals be two.

It is preferable that a position where the reference signal is generated be adjustable (settable). That is, in an aspect of the invention, the drive device according to the invention includes an adjustment unit that adjusts an angular position of the rotating shaft included in the rotation transmission mechanism so that the reference signal generator generates the reference signal at the intermediate position of the movable range of the operation ring.

In an aspect, the adjustment unit includes a rotating body that is rotated in conjunction with the rotating shaft included in the rotation transmission mechanism, and a position index that is provided on the rotating body.

Further, it may be possible to adjust an angular position so that the reference signal generator generates a reference signal at an intermediate position of the movable range of the operation ring, by rotating the rotating body so that the position index corresponds to the position of a mark provided on the drive device.

According to the invention, when the operation ring passes through the reference-signal-generation position once, it is possible to detect the position of the operation ring by counting the output pulses of the encoder (the counted numbers may be added or subtracted according to a moving direction) while using the reference-signal-generation position as a reference position. Furthermore, since the reference-signal-generation position is adjusted to the intermediate position of the movable range of the operation ring, the operation ring can pass through the reference position in a time having no significant differences even though the operation ring is present at any position. Accordingly, a very long time or a very short time is hardly taken to detect a position and a position can be detected in a substantially uniform time.

Initial processing for determining a reference position is performed for the detection of a position.

That is, the ring position detecting system of the drive device according to the invention further includes: an initial processing unit that performs initial processing including processing for rotating the operation ring over the movable range by driving the ring drive system and determining a position where the reference signal is output from the reference signal generator as a reference position by checking a state in which the pulse signals output from the encoder and the reference signal output from the reference signal generator are generated; and a memory that stores a result of the initial processing, the result including the reference position determined by the initial processing unit.

Since the movable range of the operation ring is predetermined by the structure of the lens barrel, the positions of both ends of the movable range are known. When the operation ring is rotated over the movable range, the reference signal is generated in the middle of the movable range. The number of output pulse signals of the encoder, which are generated between the both ends of the movable range and the reference-signal-generation position, is counted, and it is possible to calculate an interval (an angle, a distance, or the like) between the reference-signal-generation position (reference position) and both ends of the movable range by a ratio between the counted number and the number (which relates to the resolution of the encoder) of output pulse signals in the entire movable range. Accordingly, it is possible to decide the reference position.

The ring position detecting system of the drive device according to the invention further includes a position calculating unit the calculates the position of the operation ring based upon a series of pulse signals output from the encoder while using the reference position, which is stored in the memory, as reference. After the operation ring passes through the reference position once, the position of the operation ring is calculated by the position calculating unit.

Specifically, the operation ring is any one of a zoom ring, a focus ring, and an iris ring.

Preferably, the drive device of the invention further includes a control unit that stops the driving of the operation ring performed by the ring drive system when the position of the operation ring calculated by the position calculating unit is close to the vicinity of both ends of the movable range. Accordingly, the bump of the operation ring against both ends of the movable range is prevented. Since the position of the operation ring can be detected, this control is performed.

The initial processing will be expressed as a control method. In the drive device that is detachably mounted on the lens barrel, the control method according to the invention includes: performing initial processing that includes processing for rotating the operation ring over the movable range by driving the ring drive system and determining a position where the reference signal is output from the reference signal generator as a reference position by checking a state in which the pulse signals output from the encoder and the reference signal output from the reference signal generator are generated; and storing a result of the initial processing, which includes the determined reference position, in a memory.

The control method of detecting the position of the operation ring further includes calculating the position of the operation ring based upon a series of pulse signals output from the encoder while using the reference position, which is stored in the memory, as reference.

A part of the ring drive system and a part of the ring position detecting system also can share components. In this structure, the ring drive system includes a driving gear provided at a position where the driving gear meshes with the gear of the operation ring when the drive device is mounted on the lens barrel, and the driving gear is also used as the detection gear.

The drive device according to the invention is more generally defined as a drive device that is detachably mounted on a lens barrel holding an optical system. Further, the drive device includes a ring drive system that rotationally drives an operation ring rotatably provided on an outer periphery of the barrel. Furthermore, the drive device includes a rotation transmission mechanism that transmits a rotation of the operation ring while interlocking with the rotation of the operation ring when the drive device is mounted on the lens barrel, a rotation signal generator that detects the rotation of a rotating shaft included in the rotation transmission mechanism and outputs a series of pulse signals representing the rotation of the operation ring, and a reference signal generator that detects the rotation of the rotating shaft included in the rotation transmission mechanism and adjusts a position of the rotating shaft so that a reference signal is generated at an intermediate position of a movable range of the operation ring.

According to the invention, when the operation ring passes through the reference-signal-generation position once, it is possible to detect the position of the operation ring by counting the output pulses of the encoder (the counted numbers may be added or subtracted according to a moving direction) while using the reference-signal-generation position as a reference position. Furthermore, since the reference-signal-generation position is adjusted to the intermediate position of the movable range of the operation ring, the operation ring can pass through the reference position in a time having no significant differences even though the operation ring is present at any position. Accordingly, very long time or very short time is hardly taken to detect a position and a position can be detected in a substantially uniform time.

BRIEF DESCRIPTION OF THE DRAWINGS

FIG. 5 is a perspective view of an encoder and the like.

FIG. 6 shows an encoder gear and the like.

FIG. 8 is a plan view of the encoder and the like.

DESCRIPTION OF THE PREFERRED EMBODIMENTS

Figure 1:
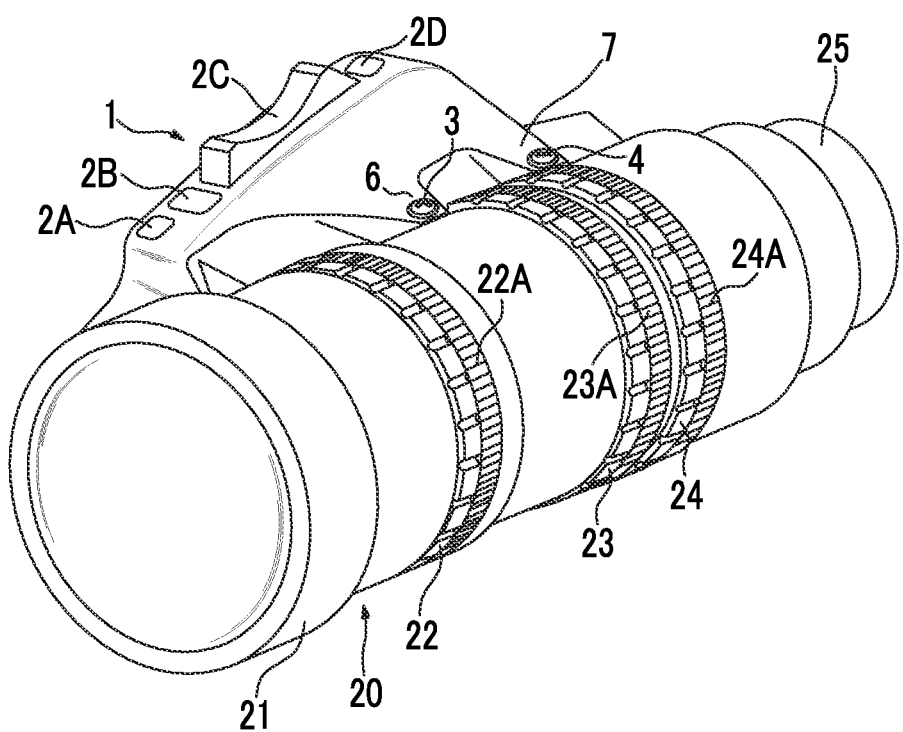
FIG. 1 is a perspective view of a lens barrel on which a drive unit is mounted.

FIG. 1 is a perspective view of a lens barrel 20 on which a drive unit (drive device) 1 is mounted. A focus ring 22, a zoom ring 23, and an iris ring 24 are rotatably provided on the outer periphery of the lens barrel 20 in this order from a front end side toward a rear end side. The focus ring 22, the zoom ring 23, and the iris ring 24 can be rotated about an optical axis of the lens barrel 20 by an angle smaller than 360° (for example, 120° in the case of the zoom lens) (movable range). Teeth 22A, 23A, and 24A are formed on the outer peripheral surfaces of the focus ring 22, the zoom ring 23, and the iris ring 24, respectively. Driving gears 81, 61, and 71 (see FIG. 3) to be described below, which are provided in the drive unit 1, mesh with these teeth (gears) 22A, 23A, and 24A, respectively, so that these rings 22, 23, and 24 are rotationally driven by the drive unit 1. A lens cover 21 is detachably mounted on the front end of the lens barrel 20. A mount portion 25, which is used to mount the lens barrel 20 on a camera body (not shown), is formed at the rear end portion of the lens barrel 20.

Imaging optical systems (all of them are not shown), such as a focus lens (a lens group), a zoom lens (a lens group), and an iris, (not shown), are held in the lens barrel 20. When a user manually rotates the focus ring 22 or rotates the focus ring 22 by using the drive unit 1 that is detachably mounted on the lens barrel, the focus lens moves in a direction of the optical axis. When the zoom ring 23 is rotated, the zoom lens moves in the direction of the optical axis. Further, when the iris ring 24 is rotated, an aperture diameter is adjusted.

An iris mode switching switch 2A, an automatic switch 2B, a zoom seesaw switch 2C, and a return switch 2D, which are operated by a user, are provided on the upper surface of the drive unit 1. The iris mode switching switch 2A is a switch used to switch a mode to an automatic mode in which the adjustment of the iris is automatically performed and a manual mode in which the adjustment of the iris is manually performed. The automatic switch 2B is a switch that is used to temporarily switch a mode to the automatic mode when the adjustment of the iris is performed in the manual mode. The zoom seesaw switch 2C is a switch that is used to give an instruction for rotating the zoom ring 23 in a clockwise or a counter clockwise to move the position of the zoom lens by the drive unit 1. The return switch 2D is a switch that is used to switch an image displayed on a view finder (not shown). In addition, a focus switch (not shown) that is used to rotate the focus ring 22 by the drive unit 1 and an iris switch (not shown) that is used to rotate the iris ring 24 are provided at the rear end portion of the drive unit 1.

Moreover, mounting legs 6, 7, 8, and 9 (see FIG. 2) are formed at four positions on the drive unit 1. Holes 6A, 7A, 8A, and 9A are formed at these mounting legs 6, 7, 8, and 9, respectively, and fixing screws 3 and 4 (for the holes 6A and 7A) (screws for the holes 8A and 9A are not shown) pass through these holes and are screwed into screw holes formed at a barrel body of the lens barrel 20 (a portion of the lens barrel 20 except for the rings 22, 23, and 24), so that the drive unit 1 is mounted on the outer peripheral surface of the lens barrel 20. When these screws 3 and 4 and the like are removed, the drive unit 1 is detached from the lens barrel 20.

Figure 2:
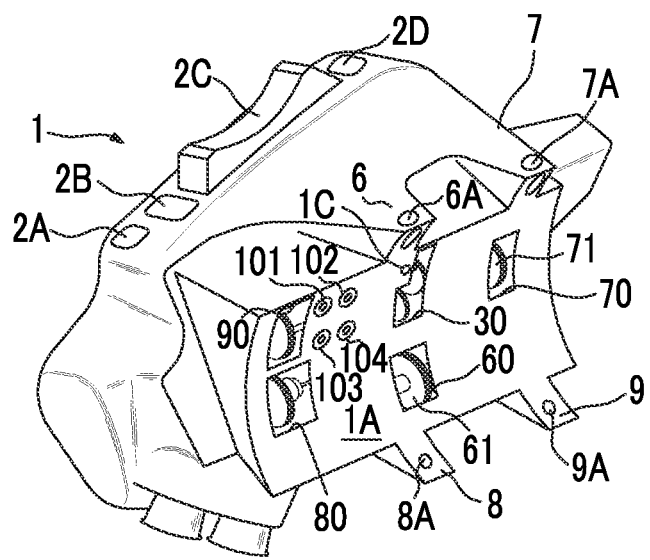
FIG. 2 is a perspective view in which an inner peripheral surface of the drive unit is shown.
Figure 3:
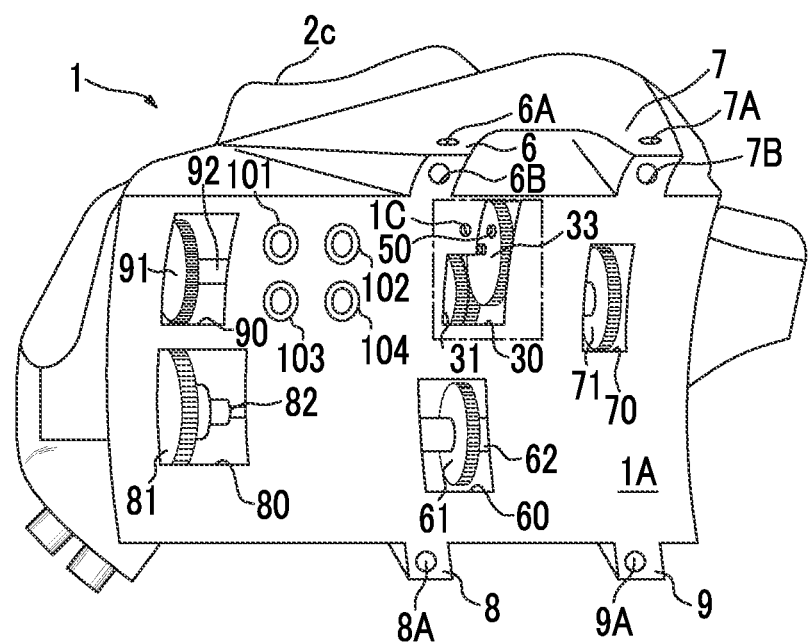
FIG. 3 is an enlarged view of the inner peripheral surface of the drive unit.
Figure 4:
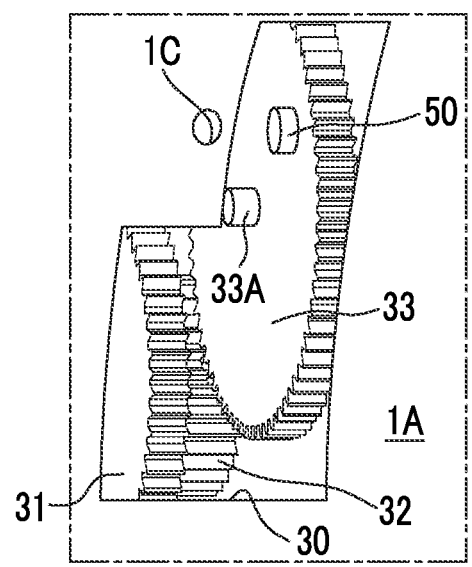
FIG. 4 is an enlarged view of a part of FIG. 3.
Figure 5:
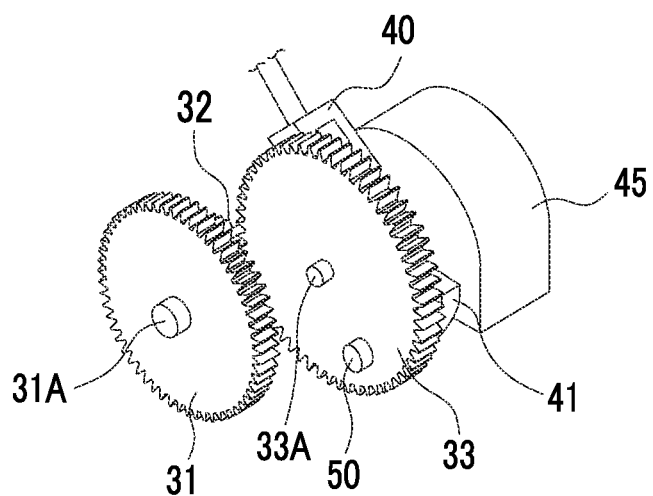
Figure 6:
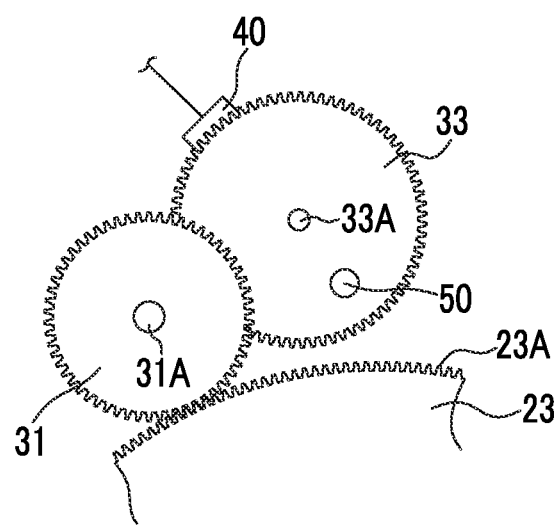
Figure 7:
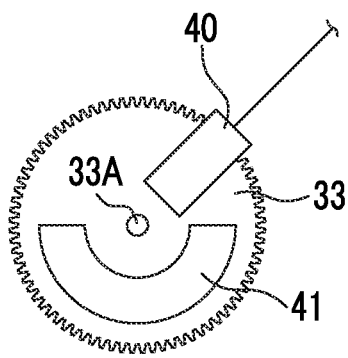
FIG. 7 shows an encoder gear and a photo interrupter.
Figure 8:
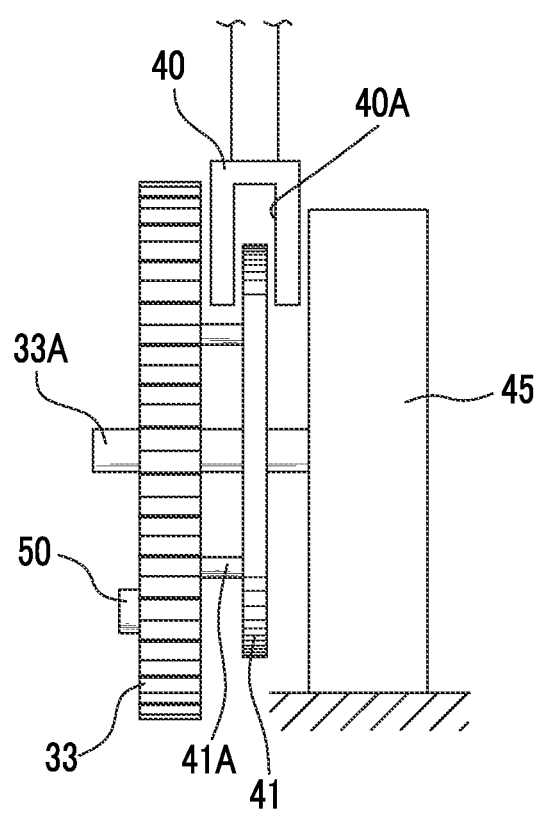

FIG. 2 is a perspective view in which an inner peripheral surface of the drive unit 1 is shown. FIG. 3 is an enlarged view of the inner peripheral surface of the drive unit 1. FIG. 4 is an enlarged view of a portion of FIG. 3 that is surrounded by a chain line.

The inner peripheral surface 1A of the drive unit 1 is concavely curved along the outer peripheral surface of the lens barrel 20. An opening 60 for the driving of the zoom lens 23 and an opening 30 for the detection of a position (the detection of an angular position) are formed at a portion of the inner peripheral surface 1A of the drive unit 1 that corresponds to the teeth 23A of the zoom ring 23 when the drive unit 1 is mounted on the lens barrel 20. Likewise, an opening 80 for the driving of the focus ring 22 and an opening 90 for the detection of a position are formed at a portion of the inner peripheral surface 1A that corresponds to the teeth 22A of the focus ring 22 when the drive unit 1 is mounted on the lens barrel 20. In addition, an opening 70 for both the driving of the iris ring 24 and the detection of the position of the iris ring 24 is formed at a portion of the inner peripheral surface 1A that corresponds to the teeth 24A of the iris ring 24.

A drive system (drive device) and a position detecting system (position detection device) for the zoom ring 23, which are provided in the drive unit 1, will be described below.

The drive system for the zoom ring 23 is provided with a driving gear (gear) 61. Since the driving gear 61 is disposed so as to face the opening 60, the driving gear 61 meshes with the teeth 23A of the zoom ring 23 when the drive unit 1 is mounted on the lens barrel 20. A shaft 62 of the driving gear 61 is rotationally driven through a necessary speed reduction mechanism (not shown) by a zoom driving motor 107 (see FIG. 9). Accordingly, the zoom ring 23 is rotated.

The angular position detecting system for the zoom ring 23 will described further with reference to FIGS. 5 to 8.

A detection gear 31 is provided at a position which faces the opening 30 and where the detection gear 31 meshes with the teeth 23A of the zoom when the drive unit 1 is mounted on the lens barrel 20. In the drive unit 1, a pinion 32 is provided integrally and coaxially with the detection gear 31 and is rotatably supported by a rotating shaft 31A. An encoder gear 33 fixed to a rotating shaft 33A, which is rotatably supported, meshes with the pinion 32. An encoder 45 is disposed and fixed in the drive unit 1, and a rotating portion of the encoder 45 is connected to a shaft 33A of the encoder gear 33 (rotation transmission mechanism). Accordingly, as the rotating shaft 33A is rotated, a series of pulse signals having a short period is output from the encoder 45 (rotation signal generator). Moreover, a semicircular light shielding plate 41 is fixed to the side surface of the encoder gear 33 by a support member 41A with a gap interposed between the side surface of the encoder gear 33 and itself so as to cover about a half of the side surface of the encoder gear 33. A detection head 40A of a photo interrupter 40 (reference signal generator), which is fixed in the drive unit 1, includes a light projecting element and a light receiving element at positions that are present on both sides of the light shielding plate 41. Accordingly, when the light shielding plate 41 enters an optical path between the light projecting element and the light receiving element of the detection head 40A, a detection signal corresponding to an H level is output from the photo interrupter 40. Gear ratios of the gears 31, 32, and 33 are set so that the encoder gear 33 substantially makes one rotation when the zoom ring 23 is rotated within the movable range thereof (for example, 120°). Since the light shielding plate 41 is provided over about a half of the circumference of the encoder gear 33, the photo interrupter 40 generates an output signal corresponding to an H level in about a half of an angular range corresponding to the movable range of the zoom ring 23.

The encoder gear 33 (rotating body) is also disposed at a position which faces the opening 30 (where the encoder gear 33 does not mesh with the teeth 23A of the zoom ring 23). A protrusion (position index) 50 is provided on the side surface of the gear 33 opposite to the side on which the light shielding plate 41 is mounted. Meanwhile, a positioning mark 1C is provided at a position near the opening 30 on the inner peripheral surface 1A of the drive unit 1. When the position of the mark 1C and the position of the protrusion 50 substantially correspond to each other (see FIG. 4), the protrusion 50 and the light shielding plate 41 are positioned so as to satisfy an angular position relationship in which the light shielding plate 41 shields the optical path of the photo interrupter 40 at an intermediate position in the movable range of the zoom ring (adjustment unit).

A drive system for the focus ring 22 includes a driving gear 81 and a focus drive motor (not shown) that rotates a rotating shaft 82 of the gear 81 through a speed reduction mechanism. The driving gear 81 faces an opening 80, and meshes with the teeth 22A of the focus ring 22 when the drive unit 1 is mounted on the lens barrel 20. A position detecting system for the focus ring 22 includes a detection gear 91 that is fixed to a rotating shaft 92 and faces the opening 90. The detection gear 91 meshes with the teeth 22A of the focus ring 22. The structure of the detecting system except for the detection gear 91 is the same as that of the detecting system for the zoom ring described with reference to FIGS. 4 to 8.

A gear 71 for both driving and the detection of a position is disposed in the drive unit 1 so as to face an opening 70 for the iris, and the gear 71 meshes with the teeth 24A of the iris ring 24 when the drive unit 1 is mounted on the lens barrel 20. The gear 71 is driven through a speed reduction mechanism by a motor for driving the iris. Further, the same detecting system as the above-mentioned detecting system for the zoom ring is provided so as to interlock with the gear 71 (all of them are not shown).

Meanwhile, screw holding holes 101 to 104, which hold screws 3 and 4 and the like used to mount the drive unit 1 on the lens barrel 20, are formed on the inner peripheral surface 1A of the drive unit 1.

Figure 9:
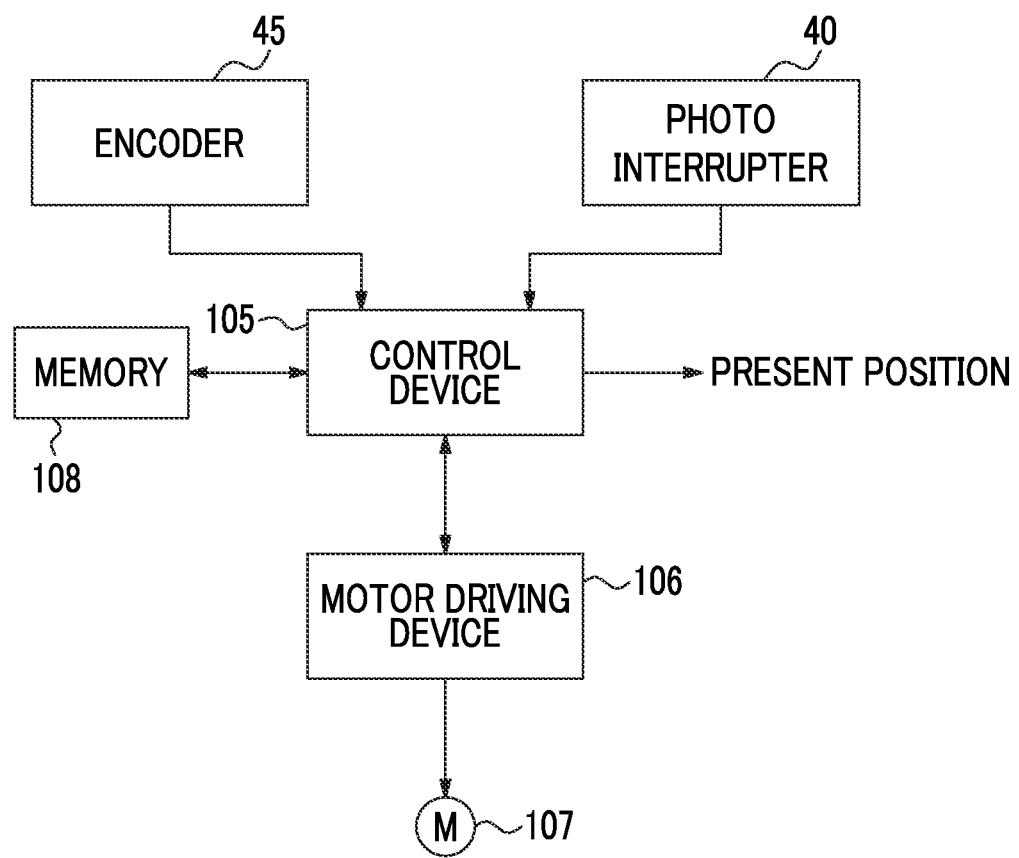
FIG. 9 is a block diagram showing the electrical configuration of a drive system and a position detecting system for a zoom ring that are provided in the drive unit.

FIG. 9 is a block diagram showing the electrical configuration of the drive system and the position detecting system for the zoom ring that are provided in the drive unit 1.

The drive unit 1 is controlled by a control device 105. The control device 105 performs initial processing, position calculation processing, and the like as described below. A memory 108 is attached to the control device 105. A motor drive device 106 performs the control of the rotation direction of the motor 107, the start of the rotation of the motor, the stop of the motor, and the like based upon instructions output from the control device 105, and performs the feedback control of the motor 107 by detecting current that flows in the motor 107. The drive systems and the position detecting systems for the focus ring and the iris ring also have the same electrical configuration.

Figure 10:
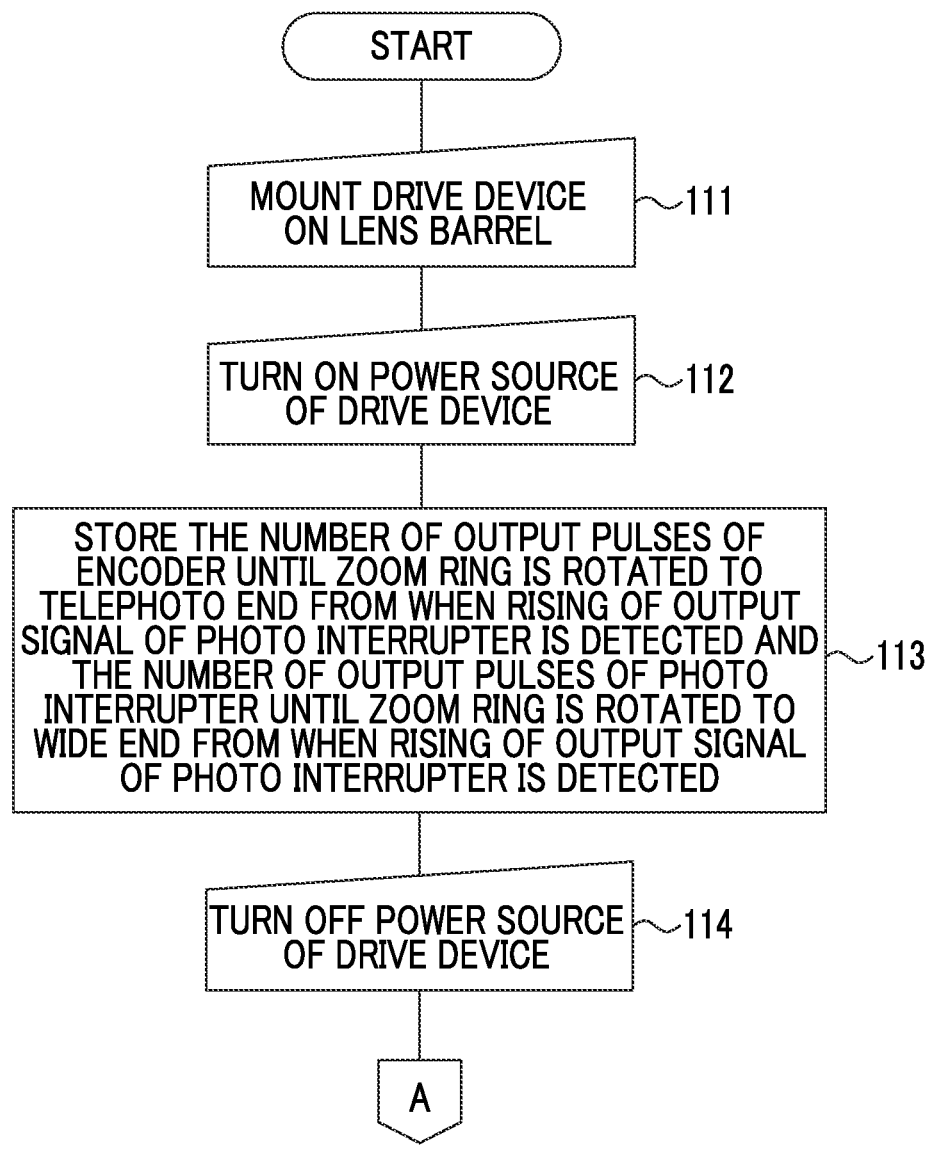
FIG. 10 is a flowchart illustrating initial processing for detecting the angular position of the zoom lens.
Figure 12:
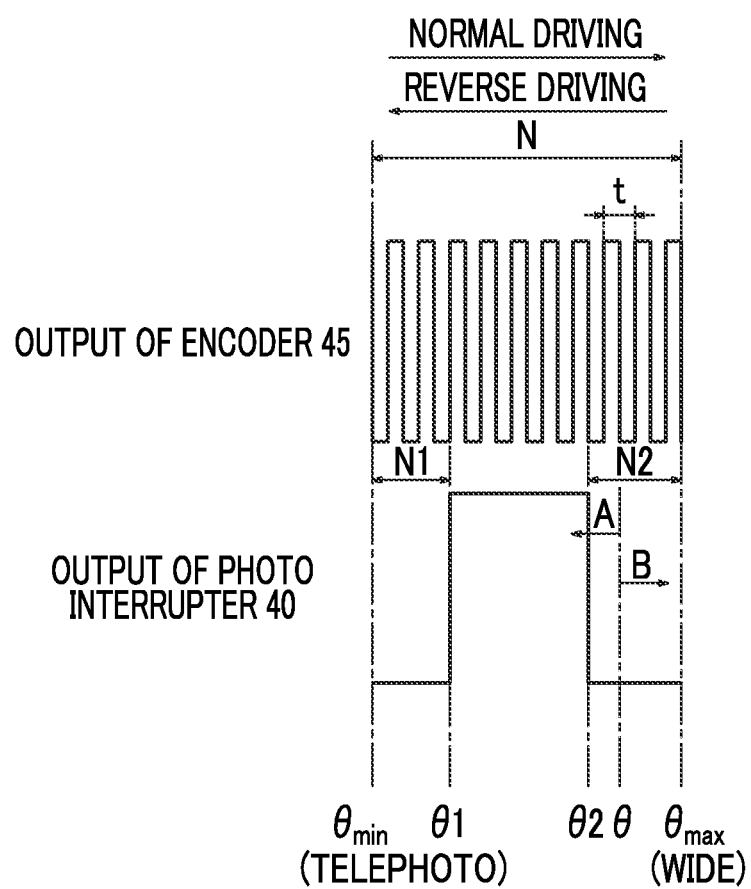
FIG. 12 is a waveform diagram showing an output signal of the encoder and an output signal of the photo interrupter.

FIG. 10 is a flowchart illustrating a procedure of initial processing for detecting the angular position of the zoom lens. FIG. 12 is a waveform diagram showing an output signal of the encoder 45 and an output signal of the photo interrupter 40. In FIG. 12, a vertical axis represents an output level and a horizontal axis represents the rotation angle of the zoom ring 23.

Before the drive unit 1 is mounted on the lens barrel 20, the encoder gear 33 is rotated by a user so that the positioning mark 1C provided on the inner peripheral surface 1A of the drive unit 1 faces the protrusion (position index) 50 provided on the encoder gear 33 (rotating body) as described above (adjustment of the angular position). Further, the zoom ring 23 is rotated by a user so that the zoom lens is positioned at a telephoto end (an end portion of the movable range of the operation ring).

After a power source of the drive unit 1 is turned off by a user (after the confirmation of the turning-off of the power source), the drive unit 1 is mounted on the lens barrel 20 (Step 111).

When the power source of the drive unit 1 is turned on (Step 112) and the zoom seesaw switch 2C is operated, the motor 107 is rotationally driven in a clockwise or a counter clockwise according to the operation direction of the switch 2C. A direction in which the zoom ring 23 moves to a wide end from the telephoto end is referred to as the clockwise, and a direction opposite thereto is referred to as the counter clockwise. When the drive unit 1 is mounted on the lens barrel 20, the driving gear 61 and the detection gear 31 are allowed to mesh with the teeth 23A of the zoom ring 23. At this time, there is a possibility that the zoom ring 23 slightly moves from the telephoto end. After the control device 105 drives the motor 107 in the counter clockwise once and confirms that the zoom ring reaches the telephoto end, the control device 105 drives the motor 107 in the clockwise in which the zoom ring 23 moves to the wide end and stops the motor 107 when the zoom ring reaches the wide end (Steps 113 and 114).

The speed reduction mechanism, which is provided between the shaft 62 of the driving gear 61 and a rotating shaft of the motor 107, is provided with a slip mechanism (not shown). Since stoppers are provided at the telephoto end and the wide end of the zoom ring (zoom lens) 23, the zoom ring (zoom lens) 23 only can move in the movable range between the telephoto end and the wide end. When the zoom ring 23 reaches the telephoto end or the wide end, the slip mechanism works and the motor 107 idles. The motor drive device 106 detects the rotation of the motor 107 by detecting current flowing in the motor 107, or the like. If the slip mechanism works and the zoom ring 23 is not rotated, the output signal of the encoder 45 is not changed. The control device 105 recognizes that the zoom ring 23 reaches an end portion (the telephoto end or the wide end), based upon the change (no change) of the output signal of the encoder 45 and the continuation of the motor rotation that is detected by the motor drive device 106. Accordingly, the control device 105 stops the motor 107 or drives the motor in reverse after stopping the motor.

When the zoom ring (zoom lens) 23 is rotated (moved) to the wide end from the telephoto end (or when the zoom ring is rotated to the telephoto end from the wide end), signals shown in FIG. 12 are output from the encoder 45 and the photo interrupter 40 and are input to the control device 105. Considering that the motor 107 is driven in a clockwise, it is regarded that the output of the photo interrupter 40 rises at a certain angular position θ1 with the rotation of the zoom ring 23 and then falls at a certain angular position θ2, and the zoom ring 23 reaches the wide end. The control device 105 counts the number N1 of pulses that are output from the encoder 45 until the rising of the output of the photo interrupter 40 is detected from when the zoom ring is rotated from the telephoto end. Further, the control device 105 counts the number N2 of pulses that are output from the encoder 45 until the zoom ring reaches the wide end from the falling of the output of the photo interrupter. In addition, the control device 105 counts the number N of pulses that are output from the encoder 45 until the zoom ring 23 reaches the wide end from the telephoto end. An angular position θmin of the telephoto end and an angular position θmax of the wide end are known, and a difference therebetween (movable range) θ0 (=θmax−θmin) is also known (stored in the memory 108). Since N output pulses of the encoder are obtained in the movable range θ0 of the zoom ring, the resolution P of the encoder 45 is θ0/N (an angle changing for a pulse interval T). An angular position θ1 corresponding to the rising of the output of the photo interrupter 40 is obtained as θmin+P·N1, and an angular position θ2 corresponding to the falling of the output of the photo interrupter 40 obtained as θmax−P·N2. These angular positions θ1 and θ2 serve as reference positions. The control device 105 (initial processing unit) stores the value N, N1, and N2 in the memory 108, and also stores the calculated reference positions θ1 and the θ2 in the memory 108.

Figure 11:
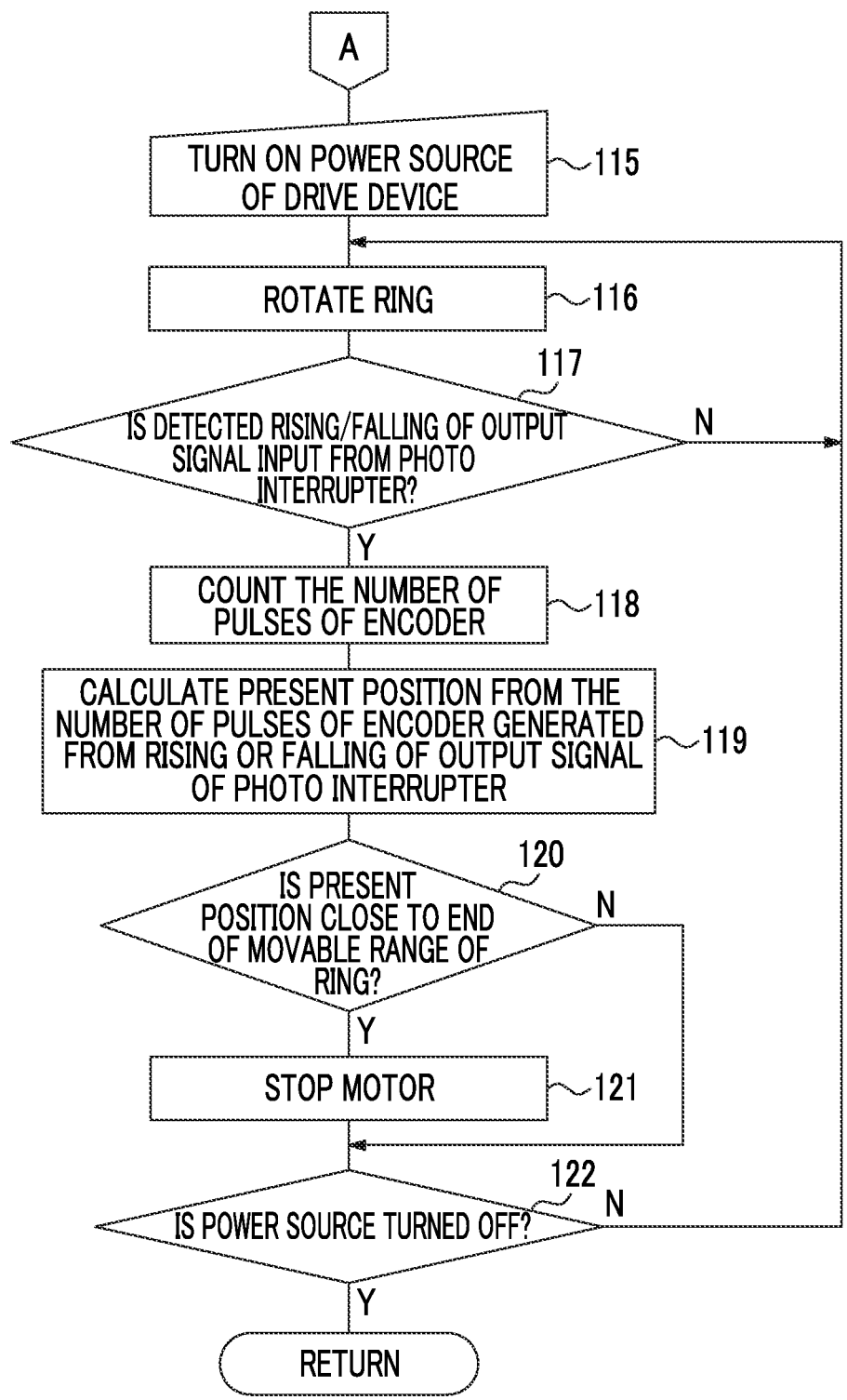
FIG. 11 is a flowchart illustrating processing for calculating the position of the zoom ring.

FIG. 11 is a flowchart illustrating processing for calculating the position of the zoom ring 23 that is performed by the control device 105 after the above-mentioned initial processing is completed.

The power source of the drive unit 1 is turned on (Step 115), the zoom seesaw switch 2C is operated, and the normal driving or reverse driving of the motor 107 is instructed (Step 116).

Now, it is regarded that the zoom ring 23 is present at a position represented by θ of FIG. 12 (the position θ is not known yet), it is regarded that the motor 107 is driven in reverse and the zoom ring 23 is moved in a direction indicated by arrow A of FIG. 12 (to the left). The control device 105 detects the rising of the output signal input from the photo interrupter 40 (at the reference position θ2, falling is detected at the time of normal driving and rising is detected at the time of reverse driving) (Step 117). Accordingly, the control device 105 recognizes that the zoom ring (zoom lens) 23 passes through the reference position θ2. After that, the control device 105 (position calculating unit) counts the number of pulses of the encoder 45, and calculates a moving amount (an angle or a distance) between the zoom ring and the reference position θ2 through which the zoom ring has passed (Step 119). If n pulses are counted at a certain point in time, the angular position of the zoom ring at that time is θ2−P·n. After the zoom ring passes through the reference position one time as described above, the control device 105 can always calculate the position of the zoom ring 23 based upon output pulses of the encoder to be input. Data representing the calculated present position is sent to the camera body on which the lens barrel 20 is mounted, and is displayed as a zoom ratio on a display screen of the camera body.

It is regarded that the zoom ring 2 is moved front the position θ in a clockwise indicated by arrow B. In this case, the control device 105 drives the motor 107 until the zoom ring 23 reaches the wide end, When the zoom ring reaches the wide end, the control device 105 stops the motor 107 once and then drives the motor 107 in reverse. Further, if the control device 105 detects the rising of the output of the photo interrupter 40, the reference position is known from the detected rising first and the present position of the zoom ring 23 can be calculated.

As described above, an angular range in which the output signal of the photo interrupter 40 has an H level is about a half of the movable range. A range in which the number N1 of pulses and the number N2 of pulses are counted is about ¼ of the movable range (the range may be set to about ⅓ of the movable range). In any case, a range (an angle or a distance in which the zoom ring 23 departs from the position θ, is moved in a clockwise, is moved in reverse after reaching the wide end, and is controlled until the zoom ring reaches the reference position θ2 is much smaller than a range in which the zoom ring is driven between the vicinity of the telephoto end and the vicinity of the wide end. Accordingly, at worst, the telephoto end reaches the reference positions θ1 and θ2 in a short time in comparison with a case in which the wide ends (both ends of the movable range) serve as reference positions. Therefore, an angular position can be detected relatively quickly.

When the telephoto ends or the wide ends (both ends of the movable range) are not used as the reference positions, another advantage is obtained. This advantage is as follows: when the detected present position reaches the vicinity of the telephoto end or the wide end (when the calculated present position corresponds to a value close to θmin or θmax) (Step 120) after the control device 105 (control unit) starts to detect a position, the motor 107 can be stopped (Step 121).

Since vibration is applied to the zoom ring 23 (zoom lens) if the zoom ring 23 (zoom lens) is moved until the zoom ring bumps against the movable range, there is a concern that a breakdown may be caused. For this reason, it is necessary to reduce the number of times of the movement of the zoom ring 23 (zoom lens to the end portion of the movable range as much as possible. When the present position of the zoom ring 23 (zoom lens) is to be detected on the basis of the end portion (the telephoto end θmin or the wide end θmax) of the movable range of the zoom ring 23, the zoom ring 23 (zoom lens) should be moved until bumping against an end of the movable range. Since the present position of the zoom ring 23 (zoom lens) is calculated on the basis of the rising or falling of the signal output from the photo interrupter 40 in this embodiment, the number of times of the movement of the zoom ring 23 (zoom lens) until the zoom ring 23 bumps against the end of the movable range is reduced.

Further, the number of reference positions, which serves as a reference used to calculate the present position of the zoom ring 23, is not one and two in this embodiment. Since the present position of the zoom ring 23 (zoom lens) is detected while any one of the reference positions θ1 and θ2 is used as reference, time which is required until the reference position used to detect the present position is detected is shortened. Accordingly, time which is required until the present position can be calculated is also shortened.

The above-mentioned embodiment relates to the zoom ring 23, but the driving of the focus ring 22 and the detection of the angular position of the focus ring 22 are performed in the same manner as described above.

Figure 13:
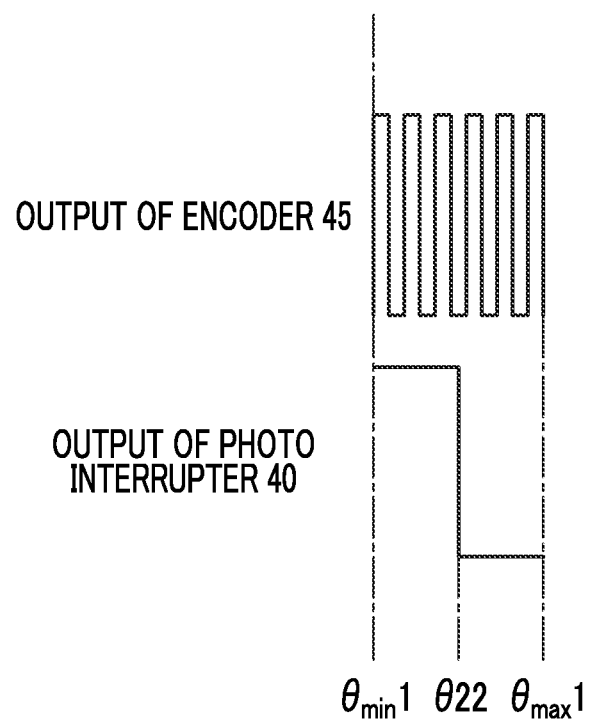
FIG. 13 shows another embodiment and is a waveform diagram showing an output signal of an encoder and an output signal of a photo interrupter.

FIG. 13 shows an example of a waveform diagram of a pulse, which is output from the encoder 45, and a signal, which is output from the photo interrupter 40, in a structure that calculates the present position of the iris ring 24 with the same principle as described above.

A movable range (for example, 60°) of the iris ring 24 is narrow, and the iris ring 24 is rotated in the movable range that is represented by a range between reference symbols θmin1 and θmax1. Only one of the rising and falling of the output signal of the photo interrupter 40 appears in this movable range. In this case, if the falling (or rising) of the output signal of the photo interrupter 40 is set to be present substantially in the middle of the movable range of the iris ring 24, time required until the reference position θ22 is detected becomes substantially constant.

What is claimed is:

1. A drive device that is detachably mounted on a lens barrel holding an optical system and includes a ring drive system rotationally driving an operation ring rotatably provided on an outer periphery of the lens barrel, the drive device comprising:
    a ring position detecting system that detects the position of the operation ring,
    wherein the ring position detecting system includes:
    a rotation transmission mechanism that includes a detection gear provided at a position where the detection gear meshes with a gear of the operation ring when the drive device is mounted on the lens barrel;
    an encoder that detects the rotation of a rotating shaft included in the rotation transmission mechanism and outputs a series of pulse signals representing the rotation of the operation ring; and
    a reference signal generator that detects the rotation of the rotating shaft included in the rotation transmission mechanism and adjusts a position of the rotating shaft so that a reference signal is generated at an intermediate position of a movable range of the operation ring.

2. The drive device according to claim 1, further comprising:
    an adjustment unit that adjusts an angular position of the rotating shaft included in the rotation transmission mechanism so that the reference signal generator generates the reference signal at the intermediate position of the movable range of the operation ring.

3. The drive device according to claim 2,
    wherein the adjustment unit includes a rotating body that is rotated in conjunction with the rotating shaft included in the rotation transmission mechanism, and a position index that is provided on the rotating body.

4. The drive device according to claim 1,
    wherein the ring position detecting system further includes:
    an initial processing unit that performs initial processing including processing for rotating the operation ring over the movable range by driving the ring drive system and determining a position where the reference signal is output from the reference signal generator as a reference position by checking a state in which the pulse signals output from the encoder and the reference signal output from the reference signal generator are generated; and
    a memory that stores a result of the initial processing, the result including the reference position determined by the initial processing unit.

5. The drive device according to claim 2,
    wherein the ring position detecting system further includes:
    an initial processing unit that performs initial processing including processing for rotating the operation ring over the movable range by driving the ring drive system and determining a position where the reference signal is output from the reference signal generator as a reference position by checking a state in which the pulse signals output from the encoder and the reference signal output from the reference signal generator are generated; and
    a memory that stores a result of the initial processing, the result including the reference position determined by the initial processing unit.

6. The drive device according to claim 3,
    wherein the ring position detecting system further includes:
    an initial processing unit that performs initial processing including processing for rotating the operation ring over the movable range by driving the ring drive system and determining a position where the reference signal is output from the reference signal generator as a reference position by checking a state in which the pulse signals output from the encoder and the reference signal output from the reference signal generator are generated; and
    a memory that stores a result of the initial processing, the result including the reference position determined by the initial processing unit.

7. The drive device according to claim 4,
    wherein the ring position detecting system further includes a position calculating unit that calculates the position of the operation ring based upon a series of pulse signals output from the encoder while using the reference position, which is stored in the memory, as reference.

8. The drive device according to claim 5,
    wherein the ring position detecting system further includes a position calculating unit that calculates the position of the operation ring based upon a series of pulse signals output from the encoder while using the reference position, which is stored in the memory, as reference.

9. The drive device according to claim 6,
    wherein the ring position detecting system further includes a position calculating unit that calculates the position of the operation ring based upon a series of pulse signals output from the encoder while using the reference position, which is stored in the memory, as reference.

10. The drive device according to claim 7, further comprising:
    a control unit that stops the driving of the operation ring performed by the ring drive system when the position of the operation ring calculated by the position calculating unit is close to the vicinity of both ends of the movable range.

11. The drive device according to claim 8, further comprising:
    a control unit that stops the driving of the operation ring performed by the ring drive system when the position of the operation ring calculated by the position calculating unit is close to the vicinity of both ends of the movable range.

12. The drive device according to claim 9, further comprising:
    a control unit that stops the driving of the operation ring performed by the ring drive system when the position of the operation ring calculated by the position calculating unit is close to the vicinity of both ends of the movable range.

13. The drive device according to claim 1, wherein the reference signal generator generates one reference signal in the movable range of the operation ring, and the reference signal is adjusted so as to be generated in the middle of the movable range.

14. The drive device according to claim 1, wherein the reference signal generator generates two reference signals in the movable range of the operation ring, and these two reference signals are adjusted so as to be generated at positions where the movable range is divided into substantially the same three portions or two positions except for a middle among positions where the movable range is divided into the same four portions.

15. The drive device according to claim 1, wherein the ring drive system includes a driving gear provided at a position where the driving gear meshes with the gear of the operation ring when the drive device is mounted on the lens barrel, and the driving gear is also used as the detection gear.

16. The drive device according to claim 1, wherein the operation ring is any one of a zoom ring, a focus ring, and iris ring.

17. A control method of performing initial processing, the method comprising:
in the drive device according to claim 1,
performing initial processing that includes processing for rotating the operation ring over the movable range by driving the ring drive system and determining a position where the reference signal is output from the reference signal generator as a reference position by checking a state in which the pulse signals output from the encoder and the reference signal output from the reference signal generator are generated; and
storing a result of the initial processing in a memory, the result including determined reference position.

18. The control method according to claim 17, further comprising:
calculating the position of the operation ring based upon a series of pulse signals output from the encoder while using the reference position, which is stored in the memory, as reference.

19. A method of adjusting an angular position, the method comprising:
in the drive device that is detachably mounted on the lens barrel according to claim 3,
adjusting an angular position so that the reference signal generator generates a reference signal at an intermediate position of the movable range of the operation ring, by rotating the rotating body so that the position index corresponds to the position of a mark provided on the drive device.

20. A drive device that is detachably mounted on a lens barrel holding an optical system and includes a ring drive system rotationally driving an operation ring rotatably provided on an outer periphery of the lens barrel, the drive device comprising:
a rotation transmission mechanism that transmits a rotation of the operation ring while interlocking with the rotation of the operation ring when the drive device is mounted on the lens barrel;
a rotation signal generator that detects the rotation of a rotating shaft included in the rotation transmission mechanism and outputs a series of pulse signals representing the rotation of the operation ring; and
a reference signal generator that detects the rotation of the rotating shaft included in the rotation transmission mechanism and adjusts a position of the rotating shaft so that a reference signal is generated at an intermediate position of a movable range of the operation ring.

* * * * *